United States Patent [19]
Monaghan

[11] 3,934,219
[45] Jan. 20, 1976

[54] ACOUSTIC METHOD AND APPARATUS FOR DETERMINING EFFECTIVENESS OF MINE PASSAGE SEAL

[75] Inventor: David A. Monaghan, Newton Center, Mass.

[73] Assignee: The United States of America as represented by the Secretary of the Interior, Washington, D.C.

[22] Filed: Sept. 11, 1974

[21] Appl. No.: 504,468

[52] U.S. Cl. ............... 340/15; 299/12; 73/67.6; 73/69; 61/35; 61/85
[51] Int. Cl.² .............. H04B 11/00; E21C 37/00; E21C 41/00; E21C 45/00
[58] Field of Search ......... 340/15; 181/108; 61/35, 61/83, 85; 299/11, 12; 169/48, 60, 61, 64; 73/67.6, 69

[56] References Cited
UNITED STATES PATENTS

| | | | |
|---|---|---|---|
| 3,211,252 | 10/1965 | Smith, Jr. et al. | 73/67.6 |
| 3,264,864 | 8/1966 | Reid et al. | 73/69 |
| 3,583,165 | 6/1971 | West et al. | 61/35 |
| 3,630,307 | 12/1971 | Kamps et al. | 73/69 |

Primary Examiner—Maynard R. Wilbur
Assistant Examiner—T. M. Blum
Attorney, Agent, or Firm—Gersten Sadowsky; Donald R. Fraser

[57] ABSTRACT

The effectivenss of a seal for extinguishing fires in an underground mine passage is determined by transmitting acoustic energy from a first site toward the seal. The acoustic energy is detected at a second site on the opposite side of the seal from the transmitting site. To provide for remote monitoring of the seal, acoustic transmitter and receiver means are lowered into the passage to the first and second sites through vertical bores. The effectiveness of the seal is determined by the amplitude of the detected acoustic energy. The size of any hole in the seal is determined by comparing the amplitude of the detected energy after the seal has been started and prior to the sealing operation commencing. The acoustic energy has a carrier frequency that randomly varies over a relatively broad band to prevent acoustic nodes in the passageway. The carrier frequency is varied between approximately 500 KHz and 4,000 KHz to enable the energy to be somewhat directional in the passage and to have a relatively uniform field in the passage downstream of the seal. To provide a relatively high signal-to-noise ratio and effectively preclude detection of energy arriving at a receiver by way of flanking paths, the acoustic energy is pulsed and the receiver is gated on only during a time interval when it is expected that the pulse will be received at the second site via the passage.

15 Claims, 5 Drawing Figures

ACOUSTIC METHOD AND APPARATUS FOR DETERMINING EFFECTIVENESS OF MINE PASSAGE SEAL

FIELD OF INVENTION

The present invention relates generally to an apparatus and method for determining the effectiveness of a seal in an underground mine passage, and more particularly, to a method and apparatus for determining the effectiveness of a seal designed to extinguish coal mine fires by utilizing acoustic energy.

BACKGROUND OF THE INVENTION

Systems and methods to extinguish fires in underground coal mine passages providing a closed volume seal in the passage have been developed; descriptions of exemplary systems and methods are found in U.S. Pat. Nos. 3,469,405 (Reinhold), 3,583,165 (West), and 3,500,934 (Magnuson). In certain of the prior art systems and methods, the closed volume seal is provided by boring into the passage and forcing sealant material into the passage through the bore. The sealant fills a cross-sectional area of the passage, thereby preventing the flow of gas through the passage from one side of the seal to the other, to enable the fire to be contained and thereafter extinguished. The technique can also be utilized to seal off mine passages that are no longer being utilized so that if a fire starts in one portion of a mine, it will not spread to another portion thereof.

It is desired to determine the effectiveness of such seals, preferably with measuring equipment that can be read at a site remote from the seal and the passage containing the seal. Also, apparatus for determining the effectiveness of the seal should:

1. indicate the percentage completion of the seal as the seal is emplaced;
2. provide a definite indication of a seal having been completed; and
3. indicate the size of an unsealable area if a complete seal is not feasible. It is necessary to determine these factors to establish the need for additional seal material, the need for additional seals in the mine, and the likely risk of one entering the mine.

The cross-sectional areas of passages to be blocked by the seal typically range from less than 50 sq. ft. to in excess of 150 sq. ft. Since leakage is most likely to occur at the seal perimeter, which may range from 30 ft. to nearly 60 ft., the likely leakage region also has a relatively wide range. The sealing barrier is relatively thick, typically being 15 ft. thick at roof level and 100 ft. on the floor of the passage. Because of these wide variations in seal geometry, as well as different gas flow patterns in the passage on either side of the seal, the pressure differential across the seal is susceptible to wide variations both in magnitude and direction, thereby complicating monitoring techniques relying on fluid mass transfer across the seal in a preferred direction.

Flanking paths along one or more passages parallel to the passage being sealed, as well as through cracks in the rock and coal of the mine, short circuit the seal being constructed after the seal has finally been emplaced. It is important to insure the completeness of each seal immediately after it has been formed, even in the presence of the flanking paths, to eliminate the expense and time consumed in returning to bore holes to top off a seal, i.e., to finally complete a seal. To permit checking of individual seals, the seal monitoring system must distinguish between paths through the seal and the flanking paths around the seal.

Several different methods and/or apparatus are known for determining the effectiveness of a seal. Some of the better known seal monitoring techniques and apparatus involve:

1. adding trace elements on one side of a seal and monitoring the elements which reach the other side;
2. monitoring the increase or decrease in fluid volume on one side of the seal;
3. coating one side of the seal with an impervious, flexible layer and searching for bubbles in the layer; and
4. detecting acoustic energy of fluid escaping through the seal, by utilizing passive acoustic techniques. Of these four approaches, all of which have disadvantages relating to at least one of the previously enumerated areas, only the last is pertinent to the present invention.

The passive acoustic technique relies on the physical mechanism of air or another gas escaping through an orifice producing sonic energy primarily in the 30 KHz to 50 KHz band. Ultrasonic equipment is available that relies on this mechanism. The equipment is utilized, for example, to detect leaks in telephone cables, tires, ducts, and other pressurized systems. From our investigations, it does not appear that the ultrasonic equipment for detecting gas escaping through an orifice is suitable for detecting flow across seals in a mine passage. In particular, the pressure drop across and flow rate through a mine passage seal are typically so low as to be undetectable by a transducer positioned in proximity to the seal-passage interface.

While passive acoustic devices responsive to much lower frequencies are used to detect the flow of water in soil, the presence of background noise at these frequencies makes the devices unsuitable for the present problem. In particular, the flow of water against the seal in passageways close to the seal and in strata of the earth close to the seal is in the same frequency range as gas that might leak through the seal to cause a likely masking of the leaking gas.

BRIEF DESCRIPTION OF THE INVENTION

In accordance with the present invention, the problems of the prior art are obviated by transmitting acoustic energy toward a seal in an underground passage, detecting the acoustic energy and determining the effectiveness of the seal from the amplitude of the detected acoustic energy. In accordance with a preferred embodiment of the invention, the acoustic energy is transmitted and detected on opposite sides of the seal, by lowering appropriate transducers into the passage through bores extending into the passage. Thereby, remote activation of an acoustic source and detection of energy from the source are provided.

To determine the percent completion of a seal as it is being emplaced, the amplitude of the received energy is monitored prior to the seal being initiated. As the area of the seal is halved, the amplitude of the received energy is likewise halved, i.e., reduced by 3 db. Thereby, by taking repeated measurements and comparing one measurement against another, a correlation is provided between the amplitude of the received detected energy size the sizze of any hole in the seal. When a complete seal has been provided, there is no acoustic energy propagated through the passage between the two sites.

The flanking path problem is avoided in accordance with another aspect of the invention by pulsing the acoustic energy source and gating the receiver "on" during a time window that is delayed relative to the activation time of the source by an amount approximately equal to the propagation time through the passage for the acoustic energy between the first and second sites. Since the propagation time of the acoustic energy between the first and second sites via the flanking paths is generally considerably in excess of the propagation time through the passage, the receiver is effectively unresponsive to energy propagated via the flanking paths. The pulsed source and gated receiver technique also enables the present invention to have a considerably higher signal-to-noise ratio than would otherwise be attained because noise occurring while the receiver is blanked (gated off) has no effect on the device. Flanking path interference and noise are further reduced by providing a relatively directional acoustic source which transmits a pressure wave that travels a relatively direct path through the passage between the first and second sites.

A possible problem in transmitting acoustic energy between the first and second sites through a passageway and seal is that stationary nulls can occur between the two sites, and possibly at the site of the receiver. Such nulls are a function of the wavelength of a carrier frequency for the acoustic energy. To eliminate stationary nulls, the carrier frequency of the source is varied over a relatively wide band, preferably in a random manner. To provide for added directivity and enable the acoustic energy to have a relatively uniform field in the passageway downstream of the seal, the acoustic energy carrier frequency is preferably varied between about 500 KHz and 4,000 KHz.

It is, accordingly, an object of the present invention to provide a new and improved apparatus for and method of determining the effectiveness of a seal in an underground passage, and in particular, the effectiveness of a coal mine seal that is designed to enable fires to be extinguished.

An additional object of the invention is to provide a new and improved method of and apparatus for determining the effectiveness of a coal mine seal by utilizing apparatus that can easily be lowered into a passage from a remote location.

A further object of the innvention is to provide a method of and apparatus for determining the percentage completion of a seal in an underground passage from a remote site.

A further object of the invention is to provide a method of and apparatus for determining the size of an unsealed area in an underground passage from a site remote from the passage.

A further object of the present invention is to provide a new and improved apparatus for and method of determining the effectiveness of a seal in an underground coal mine passage wherein flanking paths have substantially no effect on an indication of the effectiveness of the seal.

Another object of the invention is to provide a new and improved apparatus for and method of determining the effectiveness of an underground passage seal susceptible to a wide variation in geometry.

A further object of the invention is to provide a new and improved method of and apparatus for determining the effectiveness of a seal by utilizing acoustic energy, wherein the magnitude of acoustic energy coupled to a transducer is sufficiently great to be detected and provide a relatively large signal-to-noise ratio.

Still another object of the invention is to provide an apparatus for and method of determining the effectiveness of an underground seal wherein acoustic energy is transmitted between sites on opposite sides of the seal and stationary nulls do not occur in the propagation path between the sites.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figure 1:
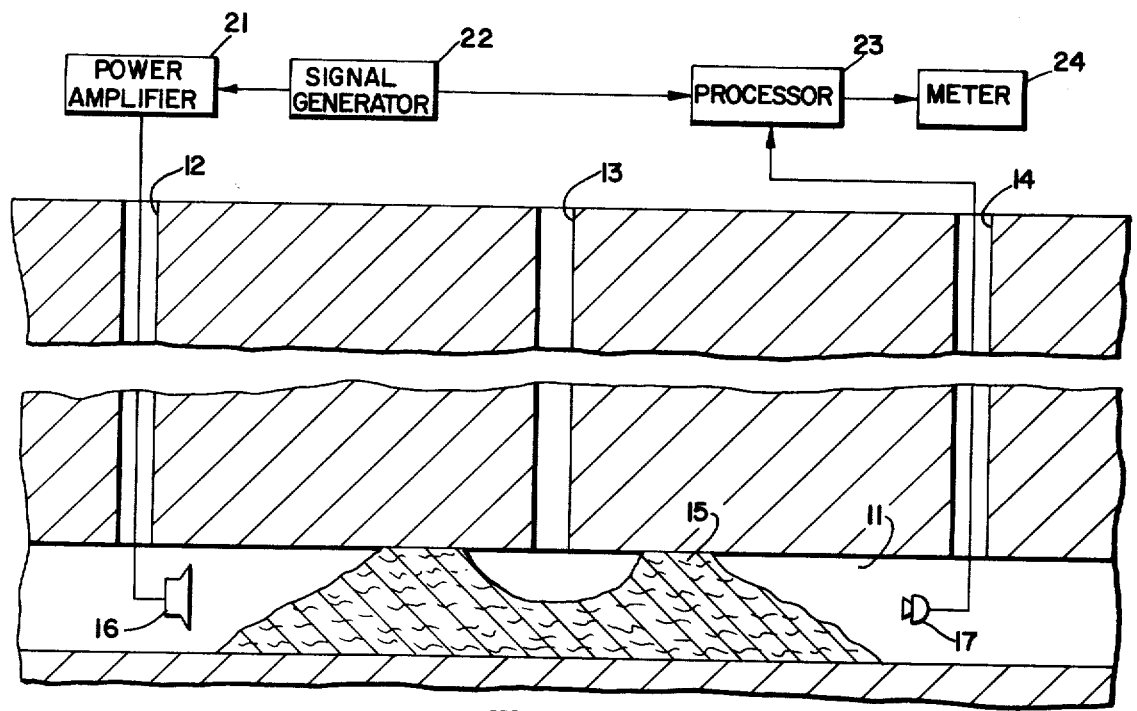
FIG. 1 is a side sectional elevation view of a seal, acoustic transmitting array, receiving microphone and signal processing electronics in accordance with a preferred embodiment of the invention.
Figure 2:
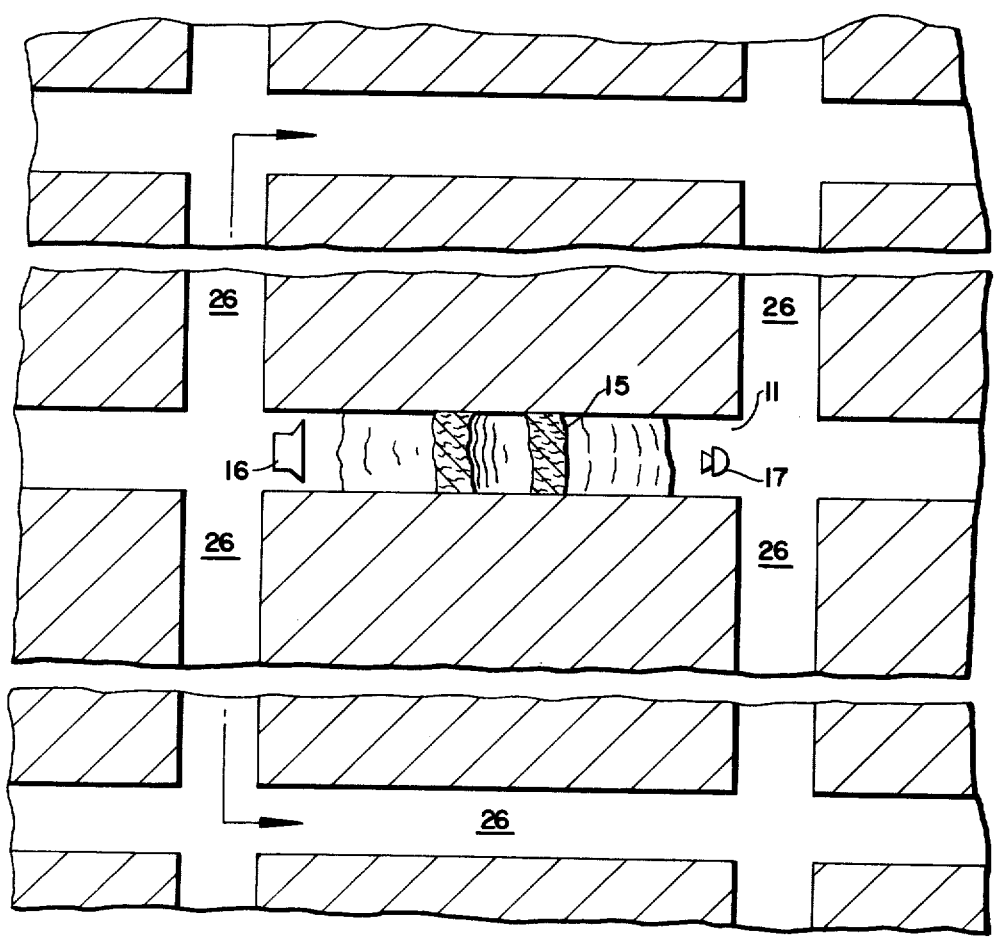
FIG. 2 is a top view of the transmitting array, seal and microphone of FIG. 1.

Reference is now made to FIGS. 1 and 2 of the drawing wherein there is illustrated a subterranean mine passage 11 into which vertical bores 12, 13 and 14 extend from the surface of the earth. Bore 13 is dimensioned to enable material forming fire extinguishing seal 15 in passage 11 to flow in fluid form through the bore into the passage. Seal 15 is formed by expansion of the material flowing through bore 13 under pressure, whereby the material intersects with and forms a bond with the walls, ceiling and floor of passage 11 on both sides of bore 13. The material forming seal 15 solidifies in situ, as schematically indicated, and is comprised of a material which, when solidified, prevents fire from passing from one side of the seal to the other side of the seal through passage 11.

Figure 3:
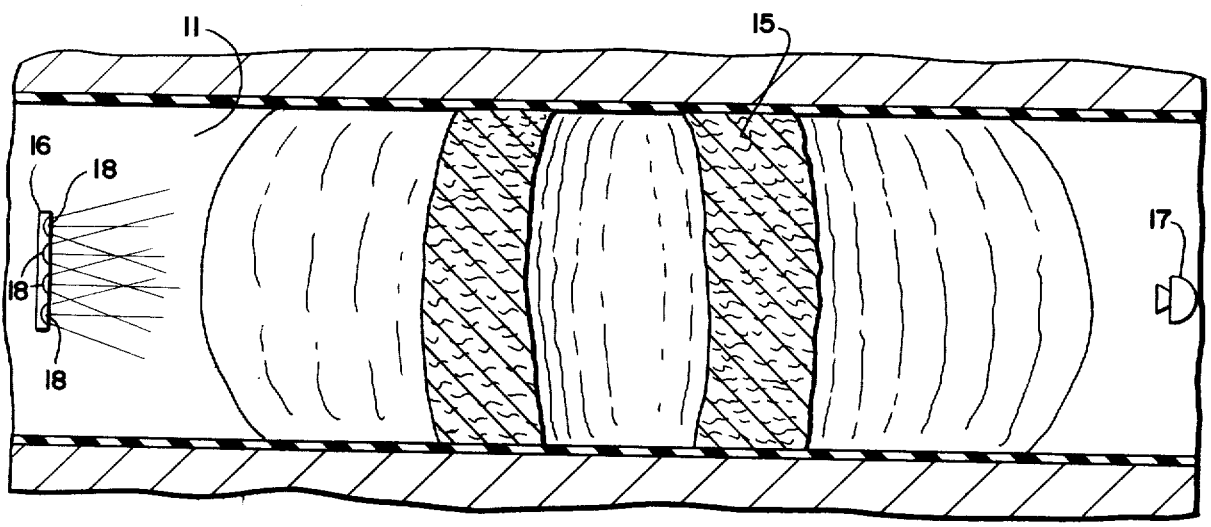
FIG. 3 is a top, cross-sectional view of a portion of a mine including the invention.

To test the effectiveness of seal 15, a directional acoustic source 16, preferably one or more electro-acoustic transducers electro-acoustic transducers 18 (FIG. 3) is lowered by suitable means, such as a winch connected to a cable, from the surface of the earth through bore 12 into passage 11 on one side of seal 15. On the other side of seal 15, an acoustic-electric transducer or microphone 17 is lowered into passage 11 from the surface of the earth through bore 14.

Power amplifier 21, which is driven by signal generator 22, periodically pulses acoustic source 16 with electric energy having a randomly variable carrier frequency. Preferably, the carrier frequency varies over a relatively wide band of frequencies, between 500 KHz and 4,000 KHz. By varying the carrier frequency emitted by array 16, the probability of stationary wave nulls in passage 11 for any substantial time period is virtually zero, whereby microphone 17 is assured of receiving acoustic energy each time that array 16 is pulsed. The particular frequency band selected enables the energy derived from array 16 to be relatively directional, thereby assuring a substantial amount of the transduced energy propagating into passage 11, while providing a relatively uniform field in passage 11 downstream of seal 15. Thereby, the exact location of microphone 17 on the side of seal 15 opposite from transmitter 16 is not particularly critical.

Acoustic energy transduced by microphone 17 is electrically coupled through a lead extending through bore 14 to electronic processor 23. Processor 23 is also responsive to pulses derived from signal generator 22. The pulses derived from signal gnerator 22 activate processor 23 at the same rate as array 16. Processor 23 receives the pulses derived from signal generator 22 and delays them by an amount approximately equal to the propagation time of the acoustic energy between array 16 and microphone 17. The delayed pulses are applied to a gate circuit, thereby effectively rendering the processor 23 to be responsive to the output of the microphone only during a relatively narrow window when it is expected that the acoustic energy from source 16 is coupled to the microphone. Gating on electronic processor 23 only during a window when it is expected that microphone 17 will be responsive to acoustic energy coupled directly to it from source 16 through passage 11 eliminates spurious signals that might be coupled to the microphone, as well as acoustic energy that propagates from source 16 to microphone 17, by way of flanking paths, such as parallel passages 26, FIG. 3, or cracks and crevices in the mine. Parallel passages 26, as well as the cracks and crevices, provide a relatively low impedance acoustic path from source 16 to microphone 17, and outside of passage 11. Because the propagation time of the acoustic energy via the flanking paths is considerably longer than the direct path between source 16 and microphone 17 through passage 11, pulsing of the source and effective gating open the output of microphone 17 enables an indication only of the radiation via the direct path to have an effect on processor 23. The output signal of processor 23 is supplied to a suitable visual indicator, such as voltmeter 24.

To provide an indication of the effectiveness of seal 15 and indicate: (1) the percentage completion of the seal as it is being emplaced, (2) the size of an unsealed area in passage 11 if a complete seal is not feasible, or (3) a definite indication of a complete seal, source 16 is activated prior to initiation of the sealing operation. The amplitude of energy transduced by microphone 17 in response to the activation of source 16 prior to the sealing operation being started is read from meter 24. In the alternative, a variable gain amplifier in processor 23 can be initially set so that meter 24 provides full deflection in response to the acoustic energy received by microphone 17. As sealant is loaded into passage 11, the amplitude of the energy transduced by microphone 17 is monitored by reading meter 24. The subsequent and initial readings of meter 24 are compared to determine the percentage completion of seal 15.

The amount of power coupled from source 16 to microphone 17 through passage 11 is inversely exponentially related to the cross-sectional area of seal 15. For a cross-sectional area of seal 15 that is one-half that of the unblocked cross-sectional area of passage 11, there is a one-half reduction in power coupled between source 16 and microphone 17 via passage 11. For each additional one-half decrement in the cross-sectional area of passage 11 through which acoustic energy can propagate, due to the increased size of seal 15, there is aan additional decrease by one-half in the power coupled between source 16 and microphone 17 via passage 11. Thereby a 3 db decrease in the relative amplitude of the output signal of microphone 17 occurs each time the cross-sectional area of passage 11 is reduced by one-half.

Figure 4:
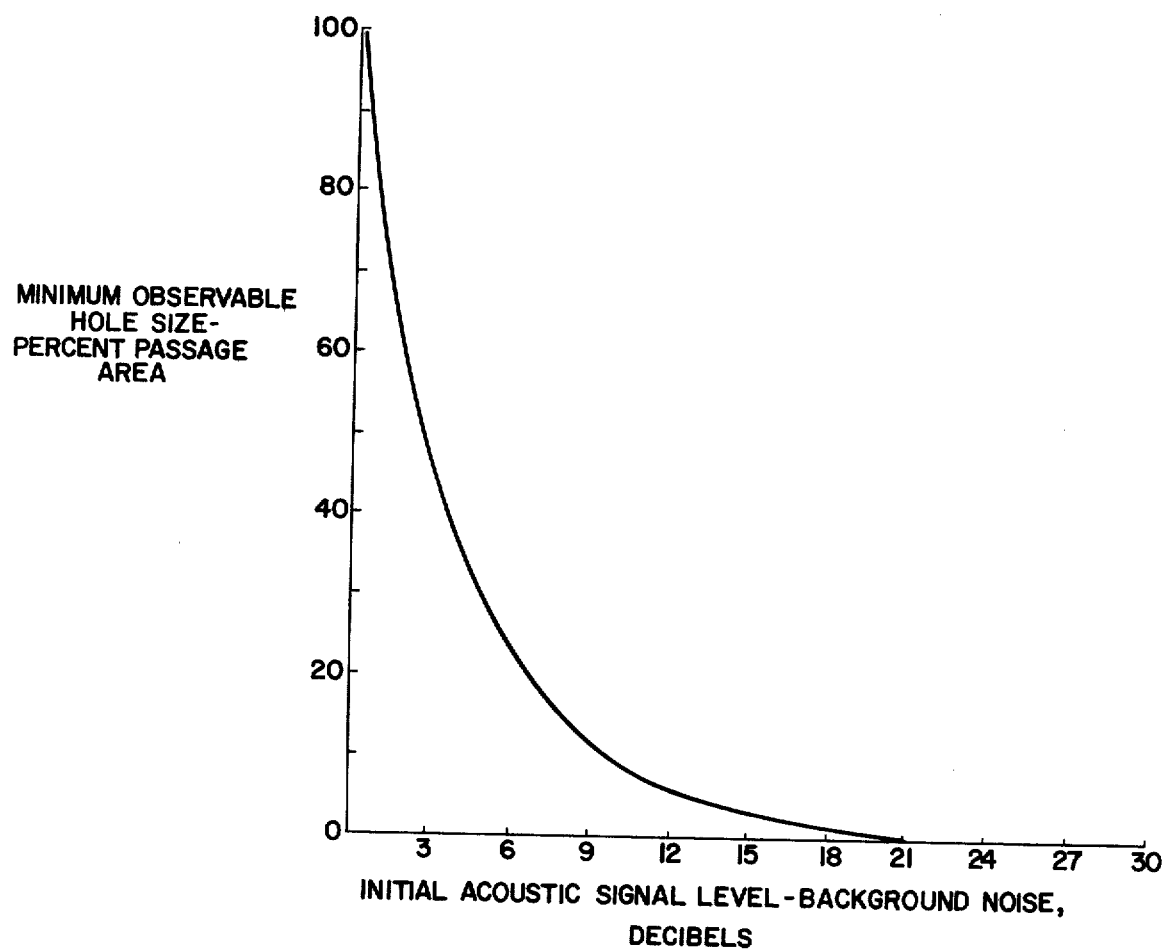
FIG. 4 is a theoretical plot of sealed area versus received acoustic signal.

FIG. 4 is a theoretical plot of the amplitude of the output signal of microphone 17, as plotted in decibels, as a percentage of the cross-sectional area of passage 11 relative to the initial cross-sectional area of the passage. By comparing the initial and subsequent readings of meter 24, it is possible from FIG. 4 to attain a correlation between the size of the unsealed area relative to the initial cross-sectional area of passage 11. In response to the signal indicated by meter 24 dropping below a predetermined level, commensurate with background noise of the apparatus, an indication is provided that seal 15 has completely blocked passage 11 and is effective to prevent the spread of fire through passage 11.

Figure 5:
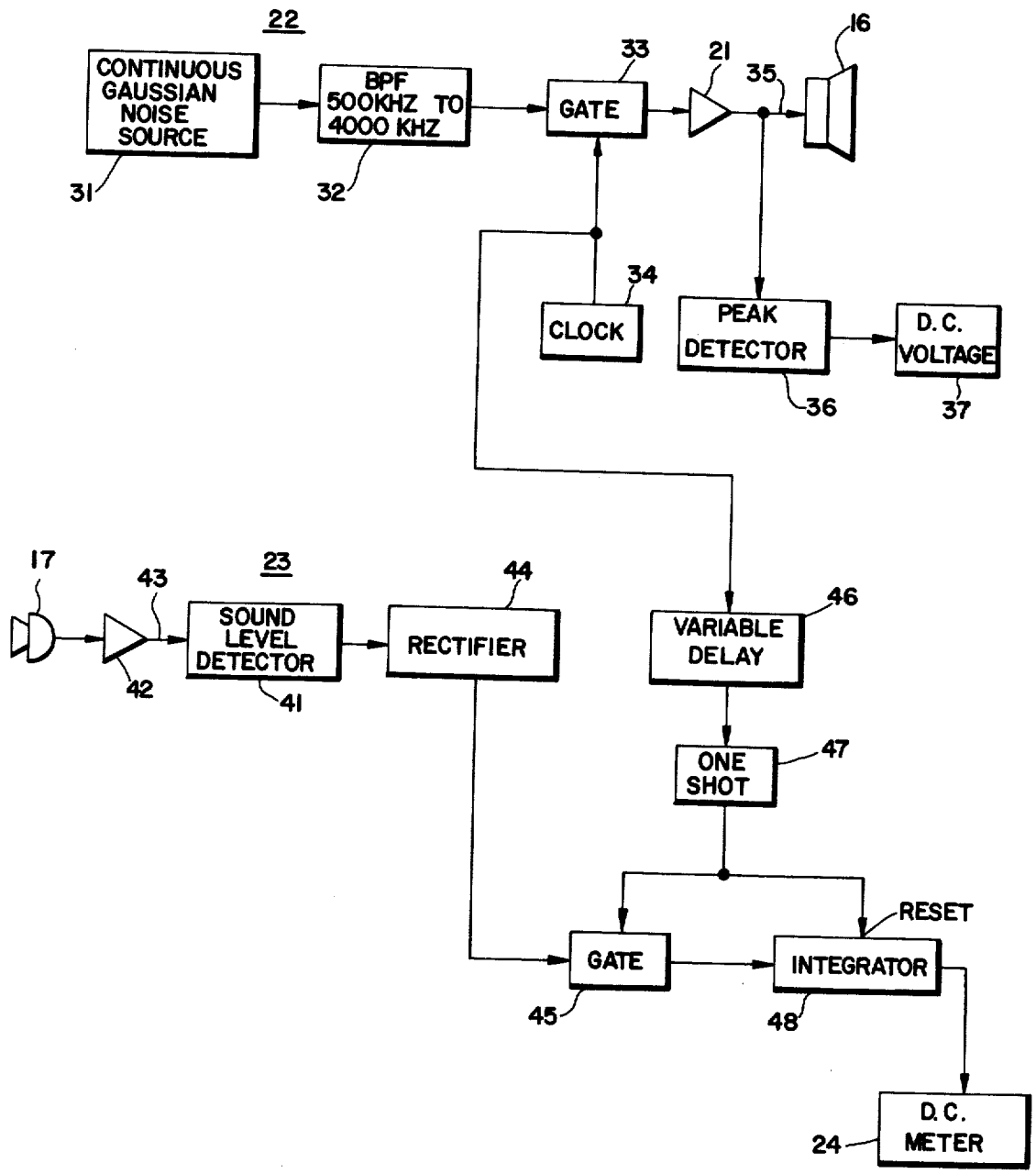
FIG. 5 is a block diagram of a preferred embodiment of the signal generator and processing electronics illustrated in FIG. 1.

Reference is now made to FIG. 5 of the drawing wherein there is illustrated, in block diagram form, a schematic diagram of the electronics utilized to activate linear acoustic array 16 and activate meter 24 in response to the output signal of microphone 17. Signal generator 22 includes a continuous Gaussian noise source, such as a Model 108 Pseudo-Random Noise Generator available from Testronic Development Laboratory, Las Cruces, New Mexico, that generates a signal in the form of a pseudo-random binary sequence when driven by an internal crystal controlled clock source. Noise source 31 includes a low pass filter to produce a continuous noise waveform with a near-Gaussian amplitude distribution. The output of Gaussian noise source 31 extends over an extremely wide bandwidth and is coupled to bandpass filter 32, having a pass band between 500 KHz and 4,000 KHz.

The noise output of filter 32 is coupled to gate 33 which is periodically activated for predetermined time intervals in response to pulses derived from clock pulse source 34. Typically, the repetition rate of pulses derived from clock source 34 is on the order of two pulses per second, and each pulse has a duration on the order of 200 milliseconds. In response to each pulse derived from source 34, gate 33 is opened to pass the variable frequency output of bandpass filter 32 to power amplifier 21. Power amplifier 21 is connected to drive speaker array 16 through lead 35, which extends between the power amplifier and the array through bore 12.

To determine if source 22 is properly operating, the output of power amplifier 21 is connected to peak detector 36, which derives an output voltage proportional to the amplitude of the peak voltage derived from amplifier 21 during each pulse. The peak detected output voltage of detector 36 is coupled to d.c. voltmeter 37, the reading of which enables an analysis of the condition of signal generator 22 to be determined.

Processing electronics network 23 includes a sound level detector 41, such as a General Radio type 1561 Precision Sound Level Meter, responsive to the signal transduced by microphone 17. Preferably, microphone 17 is of the ceramic type because such microphones are relatively rugged, stable and highly reliable. In addition, such microphones have relatively low output impedances for driving preamplifier 42, which is located in passage 11 and connected to sound level meter 41 via electric cable 43 that extends through bore 14. By providing an impedance match between the output of microphone 17 and the input of preamplifier 42, the preamplifier has low noise and high sensitivity characteristics, as well as stabilized performance under conditions of relatively high humidity. The ceramic microphone 17 is also advantageous because it generates a voltage in response to the acoustic energy received thereby, without requiring a polarizing voltage. Sound level detector 41 includes an amplifier responsive to the signal coupled thereto by cable 43. Detector 41 also includes a meter which provides a visual indication of the instantaneous sound level of the acoustic energy at microphone 17.

The output signal of the amplifier of sound level detector 41 is converted into a d.c. signal by rectifier 44. The d.c. output signal of rectifier 44 is proportional to the intensity of the energy transduced by microphone 17, whereby the output voltage of the rectifier increases with increasing energy levels detected by microphone 17.

To provide an increased signal-to-noise ratio and eliminate the possible adverse effects of the flanking paths on the output of microphone 17, the output signal of rectifier 44 is coupled to gate 45. Gate 45 is activated to pass the output signal of rectifier 44 only during a relatively narrow window following the leading edge of each pulse gated through gate 33 from filter 32 to microphone 17. The delay time between opening of gate 45 relative to the opening of gate 33 is approximately equal to the propagation time of acoustic energy through passage 11 from source 16 to microphone 17.

To these ends, the output of clock source 34 is coupled to variable delay circuit 46 which comprises a short duration pulse generator responsive to a passive delay circuit, such as a resistance capacitance circuit. The delay time of circuit 46 is manually adjustable by an operator to be slightly in excess of the propagation time of acoustic energy between source 16 and microphone 17 through passage 11. The pulse generator of circuit 46 responds to the delayed leading edge of each output pulse of clock source 34. The output pulse of variable delay circuit 46 is coupled to one shot multivibrator 47 which derives a binary one level having a leading edge in time coincidence with the pulse derived from circuit 46 and a trailing edge occurring at a variable time determined by the desired window length. The binary one level derived from one shot multivibrator 47 is applied as an enable input to gate 45, whereby the gate passes the output of rectifier 44 to integrator 48 while gate 45 is enabled.

For a typical situation, wherein the separation through passage 11 between speaker 16 and microphone 17 is on the order of 60 feet and the shortest flanking path through passages 26 is on the order of 230 feet, gate 45 is enabled for a period on the order of 60 milliseconds approximately 100 milliseconds after the leading edge of a pulse derived from clock source 34. Such parameters enable pulses detected by microphone 17 to be coupled to integrator 48 after the leading edges of the pulses have arrived at the microphone so that ragged leading edges of the transduced energy do not have an adverse effect on operation; also, any pulses that arrive at the microphone via the flanking paths are decoupled from the input of integrator 48.

Integrator 48 responds to the output of gate 45 to determine the energy in each pulse received by microphone 17 from source 16 via passage 11. After each pulse has been coupled through gate 45 and integrated by integrator 48, the integrator is reset. Resetting of integrator 48 is accomplished by coupling the output signal of one shot multivibrator 47 to a reset input of integrator 48, whereby an integrating capacitor of the integrator is short circuited in response to the trailing edge of the output of one shot multivibrator 47. Thereby, at the conclusion of each pulse detected by microphone 17, the output voltage of integrator 48 is a level that is proportional to the energy received by the microphone during the pulse time. The output of integrator 48 is coupled to d.c. meter 24 which provides an indication of the energy detected by microphone 17 over a large number of pulses. Because the time duration of each pulse coupled to integrator 48 is constant, the sole variation between pulses coupled to the integrator is a function of the energy level of the acoustic energy coupled to microphone 17 while each pulse is coupled to integrator 48. Meter 24 averages out the variable amplitude signals derived from integrator 48 over a relatively long time interval, equal to several detected pulses.

While there has been described and illustrated one specific embodiment of the invention, it will be clear that variations in the details of the embodiment specifically illustrated and described may be made without departing from the true spirit and scope of the invention as defined in the appended claims. For example, the principles of the invention are also applicable to determining if a seal is present by utilizing sonar, reflective acoustic energy techniques.

What is claimed is:

1. A method of determining the effectiveness of a seal tending to block an underground passage comprising transmitting acoustic energy in the passage toward the seal so that at least a portion of the energy impinges on the seal, a first component of the transmitted energy having a tendency to be transmitted through the seal, a second component of the transmitted energy having a tendency to be reflected from the seal, detecting one of said components of the transmitted acoustic energy, and in response to the amplitude of the detected acoustic energy determining the effectiveness of the seal.

2. The method of claim 1 wherein the acoustic energy is transmitted from one side of the seal and is detected on the opposite side of the seal.

3. The method of claim 2 further including transmitting acoustic energy in the passage toward the seal prior to the seal becoming effective, detecting the amplitude of the first component of the transmitted energy prior to the seal becoming effective, after the seal has become more effective transmitting acoustic energy in the passage toward the seal, detecting the first component of the transmitted energy after the seal has become more effective, and correlating the amplitude of the detected energy prior to the seal becoming effective with the amplitude of the detected energy after the seal has become more effective to determine the size of any hole in the seal.

4. The method of claim 2 wherein the transmitted acoustic energy has a varying, broad band carrier frequency to prevent a stationary acoustic null in the passage.

5. The method of claim 4 wherein the carrier frequency is randomly varied.

6. The method of claim 2 wherein the acoustic energy is transmitted from a directional array.

7. The method of claim 6 wherein the transmitted acoustic energy has a carrier frequency selected to enable the energy to be directional in the passage and to have a relatively uniform field in the passage downstream of the seal.

8. The method of claim 7 wherein the carrier frequency has a broad band variation to prevent a stationary acoustic null in the passage.

9. The method of claim 8 wherein the carrier frequency is varied between approximately 500 KHz and 4,000 KHz.

10. The method of claim 2 wherein the energy is transmitted from a first site in the passage and detected at a second site in the passage, at least one flanking path for the acoustic energy being provided between the first and second sites, said passage including the first and second sites having a propagation time between the sites for the energy that differs from the propagation time for the energy between the sites through the flanking path, further including the steps of pulsing the transmitted acoustic energy, and enabling the pulsed acoustic energy to be effectively detected at times exclusive of the propagation time of any flanking path.

11. The method of claim 2 wherein the energy is transmitted from a first site in the passage and detected at a second site in the passage, said passage including the first and second sites having a predetermined propagation time between the sites for the acoustic energy, and further including the steps of pulsing the transmitted acoustic energy, and enabling the pulsed energy to be effectively detected at only times delayed by the predetermined time from the times when a pulse was transmitted from the first site.

12. The method of claim 1 further including the step of placing: (a) an acoustic transmitter means for transmitting the energy and (b) receiver means for the one component in the passage by lowering the transmitter means and receiver means from the surface of the earth through displaced vertical bores that extend from the surface into the passage.

13. Apparatus for determining the effectiveness of a seal in an underground passage comprising a pulsed source of acoustic energy, means for randomly varying a carrier frequency of the energy over a relatively broad range, means for receiving the acoustic energy, an indicator responsive to the amplitude of the energy receiving means, and means responsive to an indication of a pulse being derived from the source for gating the energy to the indicator only during a time window delayed relative to the derivation of the pulsed energy from the source.

14. The apparatus of claim 13 wherein the pulsed source is a linear, directional array of electro-acoustic transducers.

15. The apparatus of claim 13 wherein the carrier frequency is varied between approximately 500 KHz and 4,000 KHz.

* * * * *